F. L. SPRING.
SHOCK ABSORBING SPRING.
APPLICATION FILED NOV. 25, 1918.

1,336,167.

Patented Apr. 6, 1920.
2 SHEETS—SHEET 1.

INVENTOR.
FREDERICK L. SPRING
BY
ATTORNEY.

F. L. SPRING.
SHOCK ABSORBING SPRING.
APPLICATION FILED NOV. 25, 1918.
1,336,167.
Patented Apr. 6, 1920.
2 SHEETS—SHEET 2.
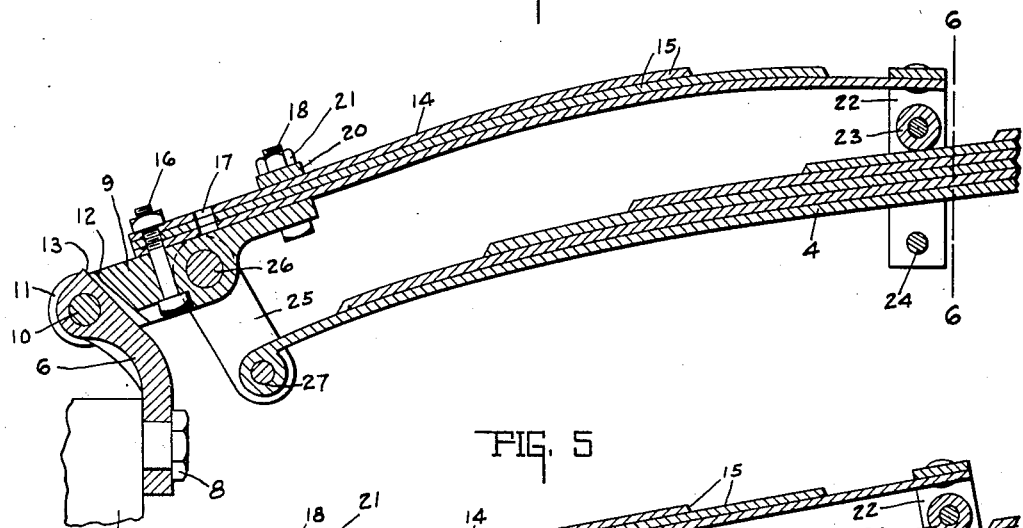
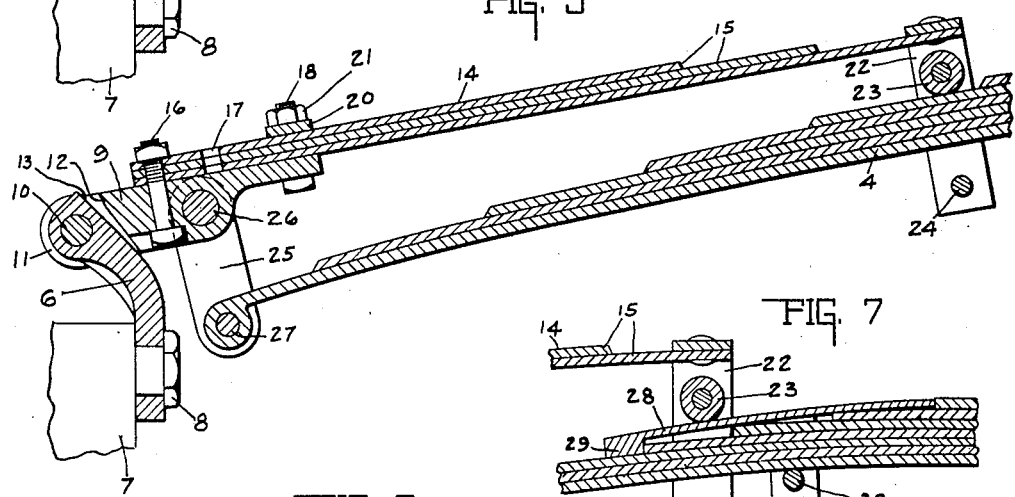
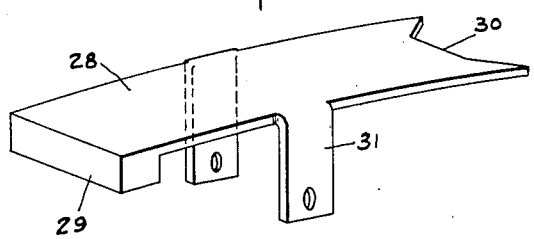
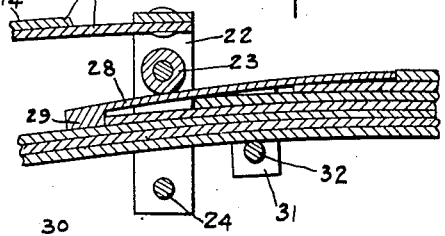
INVENTOR.
FREDERICK L. SPRING
BY
Lockwood Lockwood
ATTORNEY.

UNITED STATES PATENT OFFICE.

FREDERICK L. SPRING, OF INDIANAPOLIS, INDIANA.

SHOCK-ABSORBING SPRING.

1,336,167.      Specification of Letters Patent.      Patented Apr. 6, 1920.

Application filed November 25, 1918. Serial No. 264,074.

*To all whom it may concern:*

Be it known that I, FREDERICK L. SPRING, a citizen of the United States, and a resident of Indianapolis, county of Marion, and State of Indiana, have invented a certain new and useful Shock-Absorbing Spring; and I do hereby declare that the following is a full, clear, and exact description thereof, reference being had to the accompanying drawings, in which like numerals refer to like parts.

This invention relates to shock absorbers, and is particularly designed for use in connection with the springs of Ford cars, but it will be clearly understood that the same may be used as well with the springs of other makes of cars.

The prime feature of the invention is the provision of shock absorbing springs for coöperation with the body springs of the vehicle for increasing the resilient effect of the body spring, and at the same time absorb any shock directed against the wheels of the vehicle and assimilate such shock before it reaches the body of the vehicle.

A further feature of the invention is the provision of means for attaching the shock absorbing springs to parts of the running gear of the vehicle, and so arranging the inner ends of the shock absorbing springs that they will bear or rest upon the body springs of the vehicle and have sliding action thereover.

A further feature of the invention is the provision of an anti-friction roller, carried by the shock absorbing springs, and adapted to prevent wear between the shock absorbing and body springs.

A further feature of the invention is the provision of a plate for providing an elongated uninterrupted surface for the travel of the anti-friction roller.

A further feature of the invention is the provision of means for adjusting the shock absorbers lengthwise of their anchoring means.

A further feature of the invention is the provision of means for limiting the upward swinging movement of the shock absorbing springs.

Other objects and advantages will be hereinafter more fully set forth and pointed out in the accompanying specification.

Figure 1:
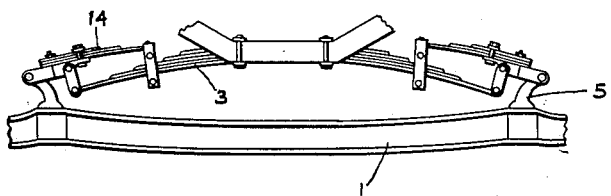
Figure 2:
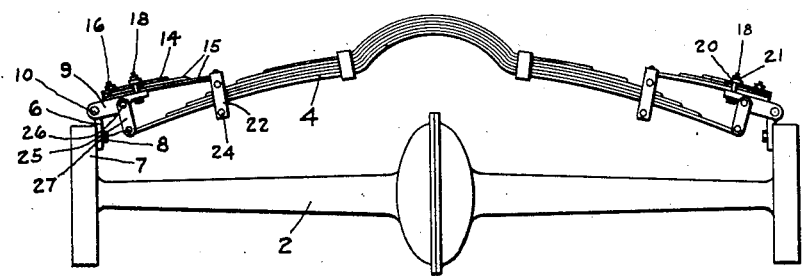
Figure 3:
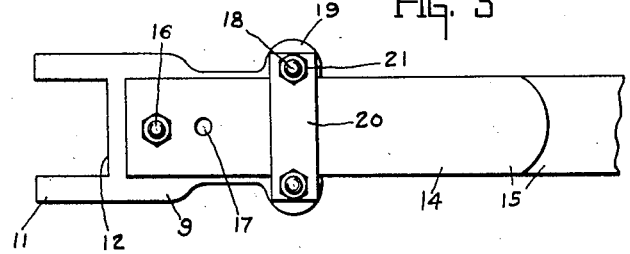
Figure 6:
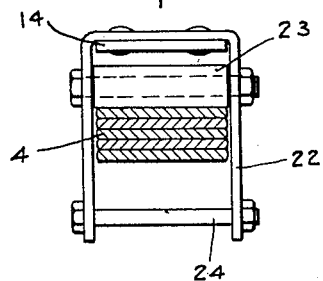

In the accompanying drawings, which are made a part of this application, Figure 1 is an elevation of the front axle and body spring of a Ford car, showing the shock absorbing springs attached thereto. Fig. 2 is a similar view of the rear axle of a Ford car. Fig. 3 is a fragmental top plan view of the pivotal end of one of the shock absorbing springs. Fig. 4 is a longitudinal sectional view on an enlarged scale of a portion of a body spring, and one of the shock absorbing springs attached thereto, and in their normal position. Fig. 5 is a similar view showing the position of the springs under stress. Fig. 6 is a sectional view as seen on line 6—6 of Fig. 4. Fig. 7 is a central longitudinal sectional view through a portion of the body spring and the inner end of one of the shock absorbing springs, showing a plate for providing an elongated surface for the travel of the anti-friction roller. Fig. 8 is a perspective view of the plate employed for increasing the travel surface for the anti-friction roller removed from the body spring.

Referring to the drawings, in which similar reference numerals designate coresponding parts throughout the several views, 1 indicates the front axle of a motor propelled vehicle, and in this instance of the Ford type, 2 indicates the rear axle of the vehicle, also of the Ford type, and 3 and 4 indicates the body springs for coöperation with the front and rear axles respectively, which are also of the Ford type. The front axle 1 is provided with the usual form of supporting brackets 5, which are in this instance reversed from the usual manner of attaching such brackets, that is to say, the upper ends thereof are curved outwardly instead of inwardly. As shown in Figs. 2, 4 and 5 a slightly modified form of bracket is employed in connection with the rear axle, said brackets being secured to the brake drum 7 by means of screw bolts 8, the curved upper ends thereof being reversed from that usually occupied by the rear brackets under ordinary use.

In the ordinary construction of the Ford automobile the ends of the body springs are suspended from the supporting brackets by means of links, but in this instance an anchoring block 9 is pivotally attached to each supporting bracket by means of a bolt 10, one end of the anchoring block having ears 11 which pass on opposite sides of the supporting block through which the bolts 10 extend. The end of the anchoring block 9, having the ears 11 thereon, is provided with a shoulder 12 which abuts against the flat face 13 of the supporting bracket when the anchoring block is swung upwardly beyond its normally swinging position, thereby limiting the upward swinging movement of the anchoring block.

Attached to the anchoring block 9 is a shock absorbing spring 14, which is preferably formed of layers of leaves 15, said leaves varying in length similar to the ordinary leaf spring. The ends of the leaves over the anchor block terminate in alinement with each other so as to form a strong butt for the spring, and through said butt and the anchoring block 9 is introduced a bolt 16 for holding the spring 14 against longitudinal movement with respect to the anchor block, and by providing a series of openings 17 longitudinally of the spring, the length of the spring may be increased or decreased as the occasion may require. The spring 14 is held against lateral swinging movement with respect to the anchor block 9 by introducing bolts 18 upwardly through lateral extensions 19 at the forward end of the anchor block and along each edge of the shock absorbing spring, the upper end of the bolt being entered through a plate 20 above the shock absorbing spring, the plate being clamped against the spring by means of nuts 21 engaging the upper ends of the bolts 18. The forward end of the spring 14 is preferably attached to a clip 22, which clip is substantially U shaped and inverted, the cross section thereof being attached rigidly to the end of the spring in any preferred manner, while the arms thereof project downwardly along each side of the body spring of the vehicle, the clip being simply to hold the end of the shock absorbing spring in alinement with the body spring and does not necessarily contact with any part of the body spring. If desired the end of the shock absorbing spring may rest directly upon the top face of the body spring, but as more or less friction naturally occurs in so mounting the shock absorbing spring, it is preferable to provide an anti-friction roller 23, which is carried by the shock absorbing spring and rests upon and rides over the upper face of the body spring. If deemed advisable a bolt or rivet 24 may be introduced through the lower ends of the arms of the clip 22, but is placed at such a distance below the body spring that it will not contact with the body spring except under extreme conditions, and is simply employed for guarding against the possibility of the clip being thrown clear of the body spring, and does not serve or act in any manner to hold the clip in engagement with the body spring, thus leaving the shock absorbing spring free to direct all of its pressure against the upper face of the body spring.

In order to use the shock absorbing spring as a leverage for the ends of the body spring, the ends of said body spring are pivotally connected with the anchor blocks 9 by links 25, the upper and lower ends of the links being secured respectively to the anchor block 9 and the end of the body spring by bolts 26 and 27.

In instances where the distance between the end of one leaf of the body springs and the end of the next succeeding leaf does not provide sufficient space for the movement of the end of the shock absorbing spring, a continuous surface may be provided by placing a wear plate 28 on top of the body spring and between it and the end of the shock absorbing spring, one end of the wear plate having a depending rib 29 thereon which abuts against the free end of one of the leaves of the body spring, while the opposite end of the wear plate is provided with a notch 30, which fits around the free end of another of the leaves of the body spring, the height of the rib 29 being such as to form an uninterrupted bearing surface for some distance over the top of the body spring. The wear plate 28 may be attached to the body spring in any suitable manner, as by means of ears 31 which depend from the wear plate, and through the lower ends of which is introduced a bolt 32 for clamping same on to the body spring.

As best shown in Fig. 4 of the drawings the body spring is curved or slightly bowed upwardly from end to end, and by resting the inner end thereof directly on the body spring and attaching the end of the body spring to the shock absorbing spring between its ends, the shock absorbing spring will tend to straighten out or lengthen, as shown in Fig. 5, when a stress is delivered upon the body spring. Consequently any shock is fully assimilated between the body spring and shock absorbing spring, and likewise any jar or shock imparted to the wheels of the vehicle will be practically absorbed before it is imparted to the body springs, resulting in a very resilient and easy riding structure.

The invention claimed is:

1. The combination with the body spring of a vehicle, and a bracket secured to some part of the vehicle near the end of the spring, of a shock absorber having an anchor block pivoted at one end of the bracket, shackle plates pivotally connected with the end of the body spring and extending up on both sides of the anchor block, a bolt extending through the shackle plates and the anchor block between the ends of the latter, an auxiliary leaf spring, means for bolting said auxiliary leaf spring to the anchor block at a point outside the connection of the shackle plates with said anchor block, means for securing the inner end of said anchor block to said auxiliary leaf spring, and means at the inner end of the auxiliary leaf spring which rests and travels on the body spring, substantially as set forth.

2. The combination with a body spring of a vehicle, and a bracket secured to some part of the vehicle near the end of the spring, of a shock absorber having an anchor block pivoted at one end of the bracket, shackle plates pivotally connected with the end of the body spring and extending up on both sides of the anchor block, a bolt extending through the shackle plates and anchor block between the ends of the latter, an auxiliary leaf spring with a plurality of bolt holes through the outer end thereof, means for bolting said auxiliary leaf spring to the anchor block through said holes at a point outside the connection of the anchor plate with said anchor block, means for releasably clamping the inner end of said anchor block to said auxiliary leaf spring at a point inside the connection of the shackle plate with said anchor block, and means at the inner end of the auxiliary leaf spring which rises and travels on the body spring, substantially as set forth.

In witness whereof I have hereunto affixed my signature.

FREDERICK L. SPRING.